United States Patent
Zhang et al.

(10) Patent No.: US 8,908,802 B2
(45) Date of Patent: Dec. 9, 2014

(54) TRANSMIT DIVERSITY METHOD, RELATED DEVICE, AND SYSTEM

(71) Applicant: Huawei Technologies Co., Ltd., Shenzhen, Guangdong (CN)

(72) Inventors: Jiayin Zhang, Shenzhen (CN); Jun Ni, Shenzhen (CN); Yi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/165,191

(22) Filed: Jan. 27, 2014

(65) Prior Publication Data
US 2014/0140435 A1  May 22, 2014

Related U.S. Application Data

(63) Continuation of application No. PCT/CN2011/077557, filed on Jul. 25, 2011.

(51) Int. Cl.
*H04B 7/06* (2006.01)
*H04B 7/02* (2006.01)

(52) U.S. Cl.
CPC ............ *H04B 7/0617* (2013.01); *H04B 7/0691* (2013.01); *H04B 7/024* (2013.01); *H04B 7/068* (2013.01); *H04B 7/0639* (2013.01)
USPC ........................................................ 375/299

(58) Field of Classification Search
USPC .......................................... 375/267, 299, 347
See application file for complete search history.

(56) References Cited

U.S. PATENT DOCUMENTS 8,670,504 B2 * 3/2014 Naguib .......................... 375/299
(Continued)

FOREIGN PATENT DOCUMENTS

| CN | 101378284 A | 3/2009 |
| CN | 101729115 A | 6/2010 |
| CN | 101826944 A | 9/2010 |
| CN | 101873644 A | 10/2010 |

(Continued)

OTHER PUBLICATIONS

"3GPP TS 36.211—$3^{rd}$ Generation Partnership Project; Technical Specification Group Radio Access Network; Evolved Universal Terrestrial Radio Access (E-UTRA); Physical Channels and Modulation (Release 10)," Version 10.1.0, $3^{rd}$ Generation Partnership Project, Valbonne, France (Mar. 2011).

*Primary Examiner* — Kevin Kim
(74) *Attorney, Agent, or Firm* — Leydig, Voit & Mayer, Ltd.

(57) ABSTRACT

Embodiments of the present invention disclose a transmit diversity method, a related device, and a system, which mainly includes: configuring two different antenna ports separately for different antennas in a network, so that the antennas can use transmit diversity based on the configured antenna ports. In one aspect, because two antenna ports are used in the network to perform transmit diversity, a diversity gain of multiple antennas is obtained. In another aspect, a cavity position caused by a completely identical precoding codebook used in the network is avoided, and therefore network communication performance is improved. The technical solutions according to the embodiments of the present invention efficiently use the transmit diversity of the multiple antennas to acquire diversity gain so as to improve network communication performance.

10 Claims, 3 Drawing Sheets

(56) References Cited

U.S. PATENT DOCUMENTS

| | | | |
|---|---|---|---|
| 2008/0298441 A1* | 12/2008 | Kikuchi et al. | 375/219 |
| 2010/0035555 A1 | 2/2010 | Bala et al. | |
| 2010/0164804 A1* | 7/2010 | Xu et al. | 342/372 |
| 2011/0194637 A1* | 8/2011 | Jiang et al. | 375/267 |
| 2012/0020334 A1 | 1/2012 | Yu et al. | |

FOREIGN PATENT DOCUMENTS

| | | |
|---|---|---|
| EP | 2388926 A1 | 11/2011 |
| EP | 2432268 A1 | 3/2012 |
| WO | WO 2010091584 A1 | 8/2010 |
| WO | WO 2010145236 A1 | 12/2010 |

\* cited by examiner

TRANSMIT DIVERSITY METHOD, RELATED DEVICE, AND SYSTEM

CROSS-REFERENCE TO RELATED APPLICATIONS

This application is a continuation of International Patent Application No. PCT/CN2011/077557, filed on Jul. 25, 2011, which is hereby incorporated by reference in its entirety.

TECHNICAL FIELD

The present invention relates to the communications field, and in particular, to a transmit diversity method, a related device, and a system.

BACKGROUND

In a wireless cellular communications system, a receiving end generally can demodulate a received signal to obtain data contained in the signal only after learning a channel from a transmitting end to the receiving end (referred to as channel estimation). A common practice is that the transmitting end sends to the receiving end a group of symbols (referred to as reference signals in a Long Term Evolution (LTE) standard known to the transmitting end and the receiving end, and the receiving end performs channel estimation according to the received reference signals. In an LTE system, a group of reference signals distributed on a specific time and a frequency resource (time-frequency resource) is referred to as an antenna port. A base station maps the antenna port to a physical antenna when transmitting data, where the data is generally placed on a time-frequency resource that is not occupied by a reference signal. The receiving end can, once learning a channel at a reference signal position, obtain a channel corresponding to a data position on the antenna port according to a correlation in time and frequency between wireless channels, so as to acquire the data therefrom. The LTE system differentiates antenna ports by numbering them uniformly, for example, an antenna port 0, an antenna port 1, an antenna port 2, an antenna port 3, and the like.

A heterogeneous network, which is a common network in a wireless cellular communications system, refers to a network that does not have a same transmission media and communications protocol. A common networking mode of heterogeneous networks is deploying several micro base stations within a coverage scope of a macro base station. These micro base stations are generally low-power nodes (LPNs), where a transmit power thereof is much less than the macro base station. An antenna configuration of the macro antenna and of each LPN may be different from each other. In order to avoid a problem of inter-cell interference and a handover that is caused when the macro base station and the LPNs are configured as different cells, the macro base station and the LPNs are generally configured as a same cell. However, because the number of antennas between the macro base station and the LPNs, and between the LPNs may be different, how to implement mapping between an antenna port and a physical antenna becomes a problem to be solved for implementing transmit diversity in the foregoing scenario.

The LTE system has the following technical solution:

All antennas on the macro base station and the LPNs are configured as an antenna port 0, that is, configured as a control channel, including a physical broadcast channel (PBCH), a physical control format indicator channel (PCFICH,), a physical downlink control channel (PDCCH1), and a physical hybrid ARQ indicator channel (PHICH), and a cell-specific reference signal (CRS) occupy only the antenna port 0. This solution deems that a cell has only one transmit antenna when transmitting a control channel and a CRS, regardless of the number of antennas on the macro base station and the LPNs. The foregoing solution has the following shortcomings: if the macro base station or an LPN has multiple antennas but the solution regards them as one antenna, no diversity gain can be obtained by using transmit diversity of the multiple antennas; regarding multiple antennas as one antenna is equivalent to using an all-ones precoding codebook, where a cavity position may be formed at different spatial positions (i.e. a value of the channel attenuates greatly at a certain position in space under the impact of the channel after codebooks are superposed, resulting in very poor performance of a receiver at such a position, and a failure in implementing a universal coverage).

SUMMARY

Embodiments of the present invention provide a transmit diversity method, a related device, and a system to obtain a diversity gain by using transmit diversity of multiple antennas, so as to improve network communication performance.

In order to solve the foregoing technical problem, the embodiments of the present invention provide the following technical solutions.

A transmit diversity method includes:

receiving, by a network node, a configuration command, where the network node is configured with N antennas, and N is an even number greater than or equal to 4;

according to the configuration command, configuring antenna ports of M antennas as a first antenna port, and configuring antenna ports of remaining (N-M) antennas as a second antenna port, where a value of M is N divided by 2;

multiplying an information symbol to be transmitted through the first antenna port by a first beamforming vector to obtain a first weighing matrix, and multiplying an information symbol to be transmitted through the second antenna port by a second beamforming vector to obtain a second weighing matrix, where both the first beamforming vector and the second beamforming vector are an M-dimensional column vector;

transmitting, by each antenna mapping to the first antenna port, an element in the first weighing matrix to a user equipment UE on a predefined subcarrier of the antenna, where the element transmitted on a single antenna is from a fixed row in the first weighing matrix, and the elements transmitted on different antennas are from different rows in the first weighing matrix; and transmitting, by each antenna mapping to the second antenna port, an element in the second weighing matrix to a user equipment UE on a predefined subcarrier of the antenna, where the element transmitted on a single antenna is from a fixed row in the second weighing matrix, and the elements transmitted on different antennas are from different rows in the second weighing matrix.

A transmit diversity method includes:

receiving, by a network node in a first network node group, a first configuration command, configuring an antenna port of a local antenna as a first antenna port according to the first configuration command, and transmitting an information symbol to be transmitted through the first antenna port to a user equipment UE on a predefined subcarrier; and receiving, by a network node in a second network node group, a second configuration command, configuring an antenna port of a local antenna as a second antenna port according to the second configuration command, and transmitting an information symbol to be transmitted through the second antenna port to a UE on a predefined subcarrier; where the network nodes in the first network node group and the second network node group are located in a same cell, and the number of antenna which is configured on each of the network nodes in the first network node group and the second network node group, is one.

A network node is configured with N antennas, where N is an even number greater than or equal to 4, and specifically includes:

a receiving unit, adapted to receive a configuration command;

a configuring unit, adapted to, according to the configuration command received by the receiving unit, configure antenna ports of M antennas as a first antenna port, and configure antenna ports of remaining (N-M) antennas as a second antenna port, where a value of M is N divided by 2;

a processing unit, adapted to multiply an information symbol to be transmitted through the first antenna port by a first beamforming vector to obtain a first weighing matrix, and multiply an information symbol to be transmitted through the second antenna port by a second beamforming vector to obtain a second weighing matrix, where both the first beamforming vector and the second beamforming vector are an M-dimensional column vector;

a first transmitting unit, located on an antenna mapping to the first antenna port, where the first transmitting unit is adapted to transmit an element in the first weighing matrix obtained by the processing unit to a user equipment UE on a predefined subcarrier, the element transmitted by the first transmitting unit on a single antenna is from a fixed row in the first weighing matrix, and the elements transmitted by the first transmitting units on different antennas are from different rows in the first weighing matrix; and a second transmitting unit, located on an antenna mapping to the second antenna port, where the second transmitting unit is adapted to transmit an element in the second weighing matrix obtained by the processing unit to a UE on a predefined subcarrier, the element transmitted by the second transmitting unit on a single antenna is from a fixed row in the second weighing matrix, and the elements transmitted by the second transmitting units on different antennas are from different rows in the second weighing matrix.

A transmit diversity system includes:

a first network node group and a second network node group, where network nodes in the first network node group and the second network node group are located in a same cell, and the number of antenna which is configured on each of the network nodes in the first network node group and the second network node group, is one; where the network node in the first network node group includes:

a first transceiving unit, adapted to receive a first configuration command; and a first processing unit, adapted to configure an antenna port of a local antenna as a first antenna port according to the first configuration command received by the first transceiving unit; where the first transceiving unit is further adapted to transmit an information symbol to be transmitted through the first antenna port to a user equipment UE on a predefined subcarrier; and the network node in the second network node group includes:

a second transceiving unit, adapted to receive a second configuration command; and a second processing unit, adapted to configure an antenna port of a local antenna as a second antenna port according to the second configuration command received by the second transceiving unit; where the second transceiving unit is further adapted to transmit an information symbol to be transmitted through the second antenna port to a UE on a predefined subcarrier.

According to the foregoing description, in the embodiments of the present invention, two different antenna ports are separately configured for different antennas in a network, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a transmit diversity method, a related device, and a system.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
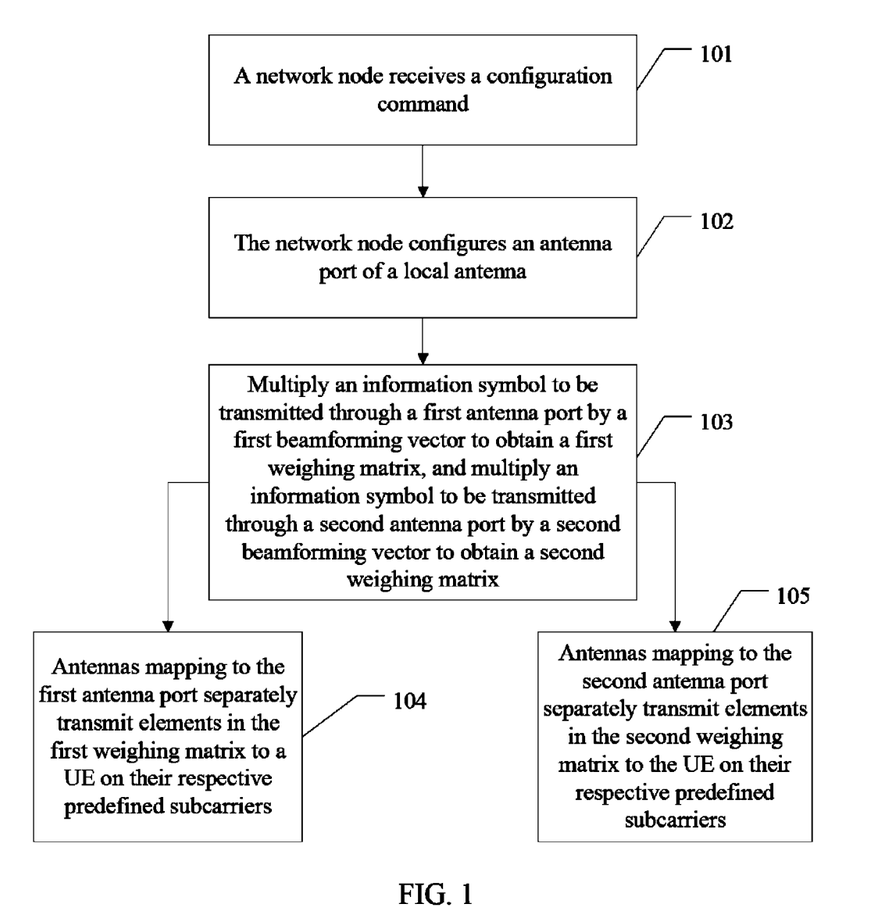
FIG. 1 is a schematic flowchart of an embodiment of a transmit diversity method according to an embodiment of the present invention.

The following describes a transmit diversity method according to an embodiment of the present invention. Refer to FIG. 1. The transmit diversity method according to the embodiment of the present invention includes:

101. A network node receives a configuration command

The network node is configured with N antennas, where N is an even number greater than or equal to 4.

The configuration command received by the network node may be from a certain network control device in a network or may also be from an input device of the network node, which is not limited herein.

102. The network node configures an antenna port of a local antenna.

The network node, upon receiving the configuration command, configures the antenna port of the local antenna according to the configuration command Specifically, the network node configures antenna ports of M antennas as a first antenna port, and configures remaining (N-M) antenna ports as a second antenna port, where a value of M is N divided by 2. In an actual application, the network node may, upon receiving the configuration command and according to the instruction of the configuration command, divide local antennas into two groups and separately configure the antenna ports of the antennas in the two groups; that is, configure antenna ports of antennas in a first group as a first antenna port, and configure antenna ports of antennas in a second group as a second antenna port. For example, assume that the network node is configured with four antennas which are an antenna 0, an antenna 1, an antenna 2, and an antenna 3, respectively, the antenna 0 and the antenna 1 may be used as a first group and the antenna 2 and the antenna 3 may be used as a second group; antenna ports of the antenna 0 and the antenna 1 are configured as an antenna port 0, and antenna ports of the antenna 2 and the antenna 3 are configured as an antenna port 1. Certainly, the first antenna port may also be the antenna port 1 or another antenna port, and the second antenna port may also be the antenna port 0 or another antenna port, which is not limited herein.

103. Multiply an information symbol to be transmitted through the first antenna port by a first beamforming (Beamforming) vector to obtain a first weighing matrix, and multiply an information symbol to be transmitted through the second antenna port by a second beamforming vector to obtain a second weighing matrix.

It should be noted that in an actual application, an LTE standard defines a variety of transmission solutions for transmitting an information symbol, and a control channel is used to identify a time-frequency resource currently assigned to a user equipment (UE, User Equipment) and a transmission solution used thereon. Hence, the UE may demodulate information symbols at the time-frequency resource positions according to a predefined handling process to acquire an estimated value of the information symbol. For example, space frequency block code (SFBC, Space Frequency Block Code) is a transmit diversity solution defined by an LTE standard and used when a network node includes two antennas. In this solution, two antennas of the network node are respectively mapped as an antenna port 0 and an antenna port 1. Assuming that symbols to be transmitted before the network node performs coding are $s_0$ and $s_1$, coding is performed first on $s_0$ and $s_1$ to generate:

$$\begin{bmatrix} s_1 & s_2 \\ -s_2^* & s_1^* \end{bmatrix}$$

where "*" in the equation represents calculating a complex conjugate.

Then, the network node transmits $s_1$ and $s_2$ respectively on neighboring subcarriers of the antenna port 0 (for example, transmits $s_1$ on a subcarrier i and transmits $s_2$ on a subcarrier i+1), and transmits $-s_2^*$ and $s_1^*$ respectively on neighboring subcarriers of the antenna port 1 (for examples, transmits $-s_2^*$ on a subcarrier i and transmits $s_1^*$ on a subcarrier i+1).

The embodiment of the present invention can, based on the definition of the LTE standard, perform a weighing operation by using a beamforming vector on an information symbol to be transmitted through an antenna port, that is, multiply the information symbol to be transmitted through the first antenna port by the first beamforming vector and multiply the information symbol to be transmitted through the second antenna port by the second beamforming vector, where both the first beamforming vector and the second beamforming vector are an M-dimensional column vector.

In an actual application, in order to improve performance of a transmit diversity system, the first beamforming vector and the second beamforming vector may be subject to orthogonal characteristics. For example, assuming that a value of M is 2, that is, the network node is configured with four antennas, the first beamforming vector may be $[w_1^0, w_1^1]^T$ and the second beamforming vector may be $[w_2^0, w_2^1]^T$, where the superior T indicates a transpose operation on a matrix; $w_1^0, w_1^1, w_2^0,$ and $w_2^1$ are real numbers; and the first beamforming vector and the second beamforming vector are subject to orthogonal characteristics, that is, subject to $w_1^0 \cdot w_2^0 + w_1^1 \cdot w_2^1 = 0$. The first beamforming vector and the second beamforming vector may be parameters set in advance in the network node or may also be acquired by the network node from the received configuration command, which is not limited herein.

104. Each antenna mapping to the first antenna port transmits an element in the first weighing matrix to the UE on a predefined subcarrier of the antenna.

The element transmitted on a single antenna is from a fixed row in the first weighing matrix, and the elements transmitted by different antennas are from different rows in the first weighing matrix. For example, assuming that a value of M is 2, that is, the network node is configured with four antennas, where an antenna 0 and an antenna 1 are configured as an antenna port 0, and a first beamforming vector is $[w_1^0, w_1^1]^T$, based on SFBC, the following first weighing matrix may be obtained in step 103:

$$\begin{bmatrix} w_1^0 s_1 & w_1^0 s_2 \\ w_1^1 s_1 & w_1^1 s_2 \end{bmatrix}$$

The antenna 0 transmits elements in the first row of the preceding equation to the UE on predefined subcarriers (for example, transmits $w_1^0 s_1$ on a predefined subcarrier and transmits $w_1^0 s_2$ on a predefined subcarrier i+1); the antenna 1 may transmit elements in the second row of the preceding equation to the UE on predefined subcarriers (for example, transmit $w_1^1 s_1$ on a predefined subcarrier i, and transmit $w_1^1 s_2$ on a predefined subcarrier i+1). Alternatively, the antenna 0 may transmit the elements in the second row of the preceding equation to the UE on the predefined subcarriers, and the antenna 1 may transmit the elements in the first row of the preceding equation to the UE on the predefined subcarriers.

105. Each antenna mapping to the second antenna port transmits an element in the second weighing matrix to the UE on a predefined subcarrier of the antenna.

The element transmitted on a single antenna is from a fixed row in the second weighing matrix, and the elements transmitted by different antennas are from different rows in the second weighing matrix. For example, assuming that a value of M is 2, that is, the network node is configured with four antennas, where an antenna 2 and an antenna 3 are configured as an antenna port 1, and a second beamforming vector is $[w_2^0, w_2^1]^T$, based on SFBC, the following second weighing matrix may be obtained in step 103:

$$\begin{bmatrix} -w_2^0 s_2^* & w_2^0 s_1^* \\ -w_2^1 s_2^* & w_2^1 s_2^* \end{bmatrix}$$

The antenna 2 may transmit elements in the first row of the preceding equation to the UE on predefined subcarriers (for example, transmit $-w_2^0 s_2^*$ on a predefined subcarrier i, and transmit $w_2^0 s_1^*$ on a predefined subcarrier i+1); the antenna 3 may transmit elements in the second row of the preceding equation to the UE on predefined subcarriers (for example, transmit $-w_2^1 s_2^*$ on a predefined subcarrier i, and transmit $w_2^1 s_1^*$ on a predefined subcarrier i+1). Alternatively, the antenna 2 may transmit the elements in the second row of the preceding equation to the UE on the predefined subcarriers, and the antenna 3 may transmit the elements in the first row of the preceding equation to the UE on the predefined subcarriers.

According to the foregoing description, in the embodiments of the present invention, two different antenna ports are separately configured for different antennas in a network, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

In order to illustrate the technical solution of the present invention more clearly, the following describes the transmit diversity method according to the embodiment of the present invention by using a specific application scenario.

Assume that a network node is configured with four antennas (that is, a value of N is 4), which are an antenna 0, an antenna 1, an antenna 2, and an antenna 3, respectively; a preset first beamforming vector $w_1$ equals $[1,1]^T$; and a preset second beamforming vector $w_2$ equals $[1,1]^T$.

The network node, upon receiving a configuration command, configures antenna ports of the antenna 0 and the antenna 1 as an antenna port 0, and configures antenna ports of the antenna 2 and the antenna 3 as an antenna port 1; left multiplies the first beamforming vector $w_1$ by $[s_1,s_2]$ and left multiplies the second beamforming vector $w_2$ by $[-s_2^*,s_1^*]$. A first weighing matrix and a second weighing matrix may be obtained respectively as follows:

$$\begin{bmatrix} s_1 & s_2 \\ s_1 & s_2 \end{bmatrix}$$

and $$\begin{bmatrix} -s_2^* & s_1^* \\ s_2^* & -s_1^* \end{bmatrix}$$

The antenna 0 transmits $s_1$ on a predefined subcarrier i and transmits $s_2$ on a predefined subcarrier i+1; the antenna 1 transmits $s_1$ on a predefined subcarrier i and transmits $s_2$ on a predefined subcarrier i+1; the antenna 2 transmits $-s_2^*$ on a predefined subcarrier i and transmits $s_1^*$ on a predefined subcarrier i+1; and the antenna 3 transmits $s_2^*$ on a predefined subcarrier i and transmits $-s_1^*$ on a predefined subcarrier i+1.

According to the foregoing description, in the embodiments of the present invention, two different antenna ports are separately configured for different antennas in a network, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

Figure 2:
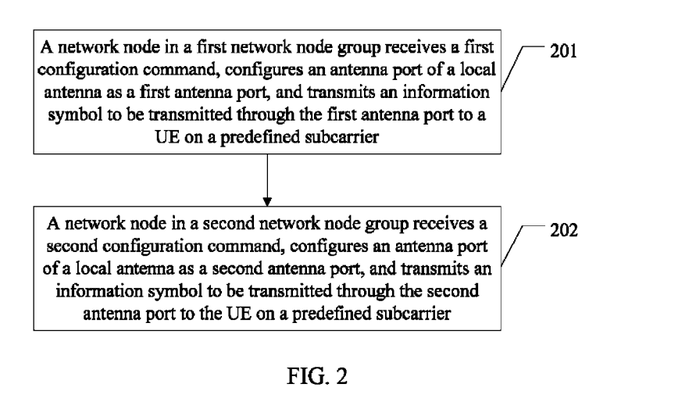
FIG. 2 is a schematic flowchart of another embodiment of a transmit diversity method according to another embodiment of the present invention.

The following describes a transmit diversity method according to an embodiment of the present invention. Refer to FIG. 2. The transmit diversity method according to the embodiment of the present invention includes:

201. A network node in a first network node group receives a first configuration command, configures an antenna port of a local antenna as a first antenna port according to the first configuration command, and transmits an information symbol to be transmitted through the first antenna port to a UE on a predefined subcarrier.

The first configuration command received by the network node may be from a certain network control device in a network or may also be from an input device of the network node, which is not limited herein.

Each network node in the first network node group is configured with one antenna. The first antenna port may be, for example, an antenna port 0, or may also be an antenna port 1 or another antenna port. When the first antenna port is an antenna port 0, based on the definition of SFBC in LTE, the information symbol may be $[s_1,s_2]$.

202. A network node in a second network node group receives a second configuration command, configures an antenna port of a local antenna as a second antenna port according to the second configuration command, and transmits an information symbol to be transmitted through the second antenna port to a UE on a predefined subcarrier.

The second configuration command received by the network node may be from a certain network control device in a network or may also be from an input device of the network node, which is not limited herein.

Each network node in the second network node group is configured with one antenna. The second antenna port may be, for example, an antenna port 1, or may also be an antenna port 0 or another antenna port. When the second antenna port is an antenna port 1, based on the definition of SFBC in LTE, the information symbol may be $[-s_2^*,s_1^*]$.

The network nodes in the first network node group and the second network node group are all located in a same cell. Further, in order to further improve communication performance of a transmit diversity system according to the embodiment of the present invention, the number of network nodes included in the first network node group may equal the number of network nodes included in the second network node group, and the network nodes in the first network node group and the second network node group may be distributed as evenly as possible in geographical locations. In an actual application, a threshold may be set in advance, where the threshold is used as a criterion to ensure that a difference between the number of network nodes included in the first network node group and the number of network nodes included in the second network node group is smaller than the threshold. It may be understood that the first antenna port and the second antenna port may be different antenna port numbers.

For example, assume that network nodes including one antenna in a same cell are a macro base station 1, an LPN 0, an LPN 1, and an LPN 2. The macro base station 1 and the LPN 0 may be used as a first network node group, and the LPN 1 and the LPN 2 are used as a second network node group. The macro base station 1 and the LPN 0 configure, upon receiving a first configuration command separately, an antenna port of a local antenna as a first antenna port (for example, may be an antenna port 0); and the LPN 1 and the LPN 2 configure, upon receiving a second configuration command separately, an antenna port of a local antenna as a second antenna port (for example, may be an antenna port 1). If the first antenna port is an antenna port 0, and the second antenna port is an antenna port 1, the macro base station 1 and the LPN 0 may transmit $s_1$ and $s_2$ respectively on their respective predefined subcarriers (for example, transmit $s_1$ on a predefined subcarrier i and transmit $s_2$ on a predefined subcarrier i+1); and the LPN 1 and the LPN 2 may transmit $-s^*_2$ and $s^*_1$ respectively on their respective predefined subcarriers (for example, transmit $-s^*_2$ on a predefined subcarrier i, and transmit $s^*_1$ on a predefined subcarrier i+1).

According to the foregoing description, in the embodiments of the present invention, two different antenna ports are separately configured for different antennas in a network, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

Figure 3:
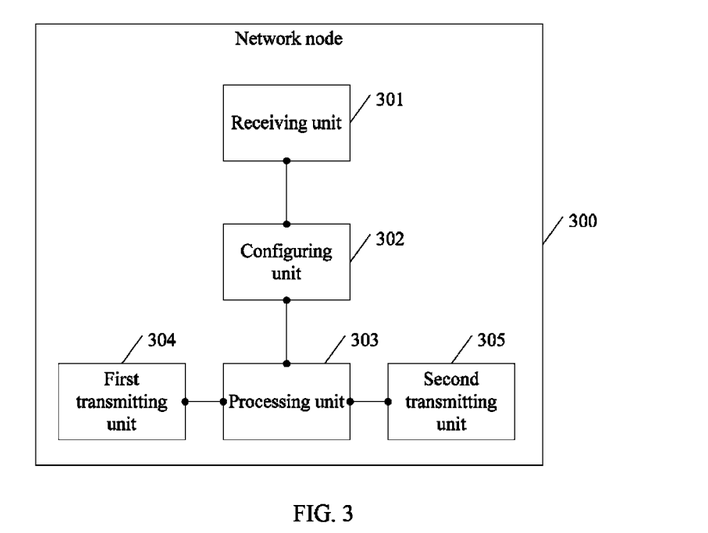
FIG. 3 is a schematic structural diagram of an embodiment of a network node according to an embodiment of the present invention.

The following describes a network node according to an embodiment of the present invention. The network node according to the embodiment of the present invention is configured with N antennas, where N is an even number greater than or equal to 4. Refer to FIG. 3. A network node 300 according to the embodiment of the present invention includes the following:

A receiving unit 301 is adapted to receive a configuration command; where the configuration command received by the receiving unit 301 may be from a network control device in a network or may also be from an input device of the network node 300, which is not limited herein.

A configuring unit 302 is adapted to, according to the configuration command received by the receiving unit 301, configure antenna ports of M antennas as a first antenna port, and configure antenna ports of remaining (N-M) antennas as a second antenna port, where a value of M is N divided by 2.

A processing unit 303 is adapted to multiply an information symbol to be transmitted through the first antenna port by a first beamforming vector to obtain a first weighing matrix, and multiply an information symbol to be transmitted through the second antenna port by a second beamforming vector to obtain a second weighing matrix; where both the first beamforming vector and the second beamforming vector are an M-dimensional column vector.

Further, the first beamforming vector and the second beamforming vector may be made to be orthogonal, so as to improve performance of a transmit diversity system.

A first transmitting unit 304 is located on an antenna mapping to the first antenna port, where the first transmitting unit 304 is adapted to transmit an element in the first weighing matrix obtained by the processing unit 303 to the UE on a predefined subcarrier, the element transmitted by the first transmitting unit 304 on a single antenna is from a fixed row in the first weighing matrix, and the elements transmitted by the first transmitting unit 304 on different antennas are from different rows in the first weighing matrix.

A second transmitting unit 305 is located on an antenna mapping to the second antenna port, where the second transmitting unit 305 is adapted to transmit an element in the second weighing matrix obtained by the processing unit 303 to a UE on a predefined subcarrier, the element transmitted by the second transmitting unit 305 on a single antenna is from a fixed row in the second weighing matrix, and the elements transmitted by the second transmitting unit 305 on different antennas are from different rows in the second weighing matrix.

In the embodiment of the present invention, the network node 300 may be a macro base station or may also be an LPN such as a micro base station, a Pico base station, a relay, and a Femto base station, which is not limited herein.

According to the foregoing description, in the embodiment of the present invention, the network node including multiple antennas is configured with two different antenna ports, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

It should be noted that the network node 300 in the embodiment may be the network node in the foregoing method embodiments, and may be used to implement all technical solutions in the foregoing method embodiments, where functions of functional modules thereof may be specifically implemented according to the methods in the foregoing method embodiments, and reference may be made to related description in the foregoing embodiments for specific implementation processes thereof, which will not be repeated herein.

Figure 4:
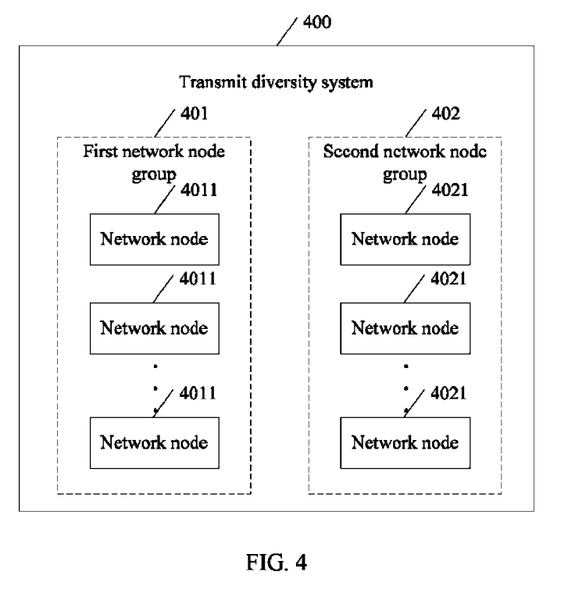
FIG. 4 is a schematic structural diagram of an embodiment of a transmit diversity system according to an embodiment of the present invention.

The following describes a transmit diversity system according to an embodiment of the present invention. Refer to FIG. 4. A transmit diversity system 400 according to the embodiment of the present invention includes:

a first network node group 401 and a second network node group 402; where network nodes 4011 included in the first network node group 401 and network nodes 4021 included in the second network node group 402 are both located in a same cell, and each network node in the first network node group 401 and the second network node group 402 is configured with one antenna.

In an actual application, in order to further improve communication performance of the transmit diversity system 400, the number of network nodes 4011 and the number of network nodes 4021 may be equivalent, and the network nodes 4011 and the network nodes 4012 may be distributed as evenly as possible in geographical locations. In an actual application, a threshold may further be set in advance, where the threshold is used as a criterion to ensure that a difference between the number of network nodes 4011 and the number of network nodes 4021 is less than the threshold.

Figure 5:
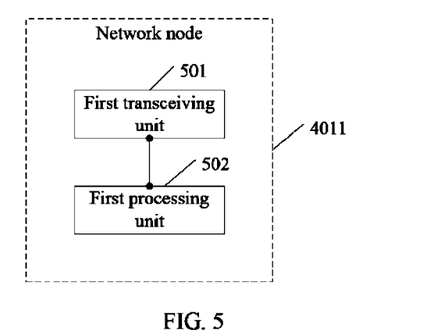
FIG. 5 is a schematic structural diagram of an embodiment of a network node in a transmit diversity system according to an embodiment of the present invention.

As shown in FIG. 5, the network node 4011 includes:

a first transceiving unit 501, adapted to receive a first configuration command; and a first processing unit 502, adapted to configure an antenna port of a local antenna as a first antenna port according to the first configuration command received by the first transceiving unit 501; where the first transceiving unit 501 is further adapted to transmit an information symbol to be transmitted through the first antenna port to a UE on a predefined subcarrier.

The network node 4021 includes:

a second transceiving unit, adapted to receive a second configuration command; and a second processing unit, adapted to configure an antenna port of a local antenna as a second antenna port according to the second configuration command received by the second transceiving unit; where the second transceiving unit is further adapted to transmit an information symbol to be transmitted through the second antenna port to a UE on a predefined subcarrier.

In the embodiment of the present invention, the network node may be a macro base station or may also be an LPN such as a micro base station, a Pico base station, a relay, and a Femto base station, which is not limited herein.

According to the foregoing description, in the embodiments of the present invention, two different antenna ports are separately configured for different antennas in a network, so that the antennas can use transmit diversity based on the configured antenna ports. In one aspect, because two antenna ports are used in the network to perform transmit diversity, a diversity gain of multiple antennas is obtained; in another aspect, a cavity position caused by a completely identical precoding codebook used in the network is avoided, and therefore network communication performance is improved.

It should be noted that the first network node group 401 in the embodiment may be the first network node group in the foregoing method embodiments; the second network node group 402 in the embodiment may be the second network node group in the foregoing method embodiments; the network node 4011 in the embodiment may be the network node in the first network node group in the foregoing method embodiments; and the network node 4021 in the embodiment may be the network node in the second network node group in the foregoing method embodiments, which may be adapted to implement all technical solutions of the foregoing method embodiments, where functions of functional modules thereof may be specifically implemented according to the method in the foregoing method embodiments, and reference may be made to related description in the foregoing embodiments for specific implementation processes thereof, which will not be repeated herein.

It should be noted that all antennas in the technical solutions of the present invention refer to physical antennas.

It may be clearly understood by a person skilled in the art that, for the purpose of convenient and brief description, for a detailed working process of the foregoing system, device, and unit, reference may be made to a corresponding process in the foregoing method embodiments, which will not be repeated herein.

In the several embodiments provided in the present application, it should be understood that the disclosed system, device, and method may be implemented in another manner. For example, the described device embodiment is merely exemplary. For example, the unit division is merely logical function division and there may be other division in actual implementation. For example, a plurality of units or components may be combined or integrated into another system, or some features may be ignored or not performed. In addition, the displayed or discussed mutual couplings, direct couplings, or communications connections may be implemented through some interfaces, and the indirect couplings or communications connections between the devices or units may be implemented in electronic, mechanical, or another form.

The units described as separate parts may or may not be physically separate, and the parts displayed as units may or may not be physical units, may be located in one position, or may also be distributed on a plurality of network units. Some or all of the units may be selected to achieve the objective of the solution of the embodiment according to an actual need.

In addition, functional units in the embodiments of the present invention may be integrated into one processing unit, or each of the units may also exist alone physically, or two or more units may also be integrated into one unit. The integrated units may be implemented in a form of hardware, or may also be implemented in a form of a software functional unit.

When the integrated units are implemented in a form of a software functional unit and sold or used as an independent product, the integrated units may be stored in a computer-readable storage medium. Based on such an understanding, the technical solutions of the present invention essentially, a part contributing to the prior art, or all or a part of the technical solutions may be presented in a form of a software product. The computer software product is stored in a storage medium and includes several instructions for enabling a computer device (which may be a personal computer, a server, a network device, or the like) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

A transmit diversity method, a related device, and a system according to the present invention are described above in detail. A person of ordinary skill in the art may make modifications to the specific implementation and application scope of the present invention based on the spirit of the embodiments of the present invention. Therefore, the content of the specification shall not be construed as a limitation on the present invention.

What is claimed is:

1. A transmit diversity method, comprising:

receiving, by a network node configured with N antennas, a configuration command, wherein N is an even number greater than or equal to 4;

according to the configuration command, configuring antenna ports of M antennas as a first antenna port and configuring antenna ports of the remaining N-M antennas as a second antenna port, wherein M is a number equal to N divided by 2;

multiplying an information symbol to be transmitted through the first antenna port by a first beamforming vector to obtain a first weighing matrix, wherein the first beamforming vector is an M-dimensional column vector;

multiplying an information symbol to be transmitted through the second antenna port by a second beamforming vector to obtain a second weighing matrix, wherein the second beamforming vector is an M-dimensional column vector;

transmitting, by each antenna mapping to the first antenna port, an element in the first weighing matrix to a user equipment (UE) on a predefined subcarrier of the antenna, wherein each antenna mapping to the first antenna port transmits an element from a fixed row in the first weighing matrix and the elements transmitted by different antennas are from different fixed rows in the first weighing matrix; and transmitting, by each antenna mapping to the second antenna port, an element in the second weighing matrix to the user equipment UE on a predefined subcarrier of the antenna, wherein each antenna mapping to the second antenna port transmits an element from a fixed row in the second weighing matrix and the elements transmitted on different antennas are from different fixed rows in the second weighing matrix.

2. The method according to claim 1, wherein:
the first antenna port is an antenna port 0;
the second antenna port is an antenna port 1;
the information symbol to be transmitted through the first antenna port is defined by space-frequency block code (SFBC); and
the information symbol to be transmitted through the second antenna port is defined by the SFBC.

3. The method according to claim 1, wherein:
the first beamforming vector is orthogonal to the second beamforming vector.

4. A transmit diversity method, comprising:
receiving, by a network node in a first network node group, a first configuration command;
configuring an antenna port of a local antenna as a first antenna port according to the first configuration command;
transmitting an information symbol to be transmitted through the first antenna port to a user equipment (UE) on a predefined subcarrier;
receiving, by a network node in a second network node group, a second configuration command;
configuring an antenna port of a local antenna as a second antenna port according to the second configuration command; and
transmitting an information symbol to be transmitted through the second antenna port to the UE on a predefined subcarrier;
wherein the network nodes in the first network node group and the network nodes in the second network node group are located in a single cell, and
wherein one antenna is configured in each of the first network node group and the second network node group.

5. The method according to claim 4, wherein the first antenna port is an antenna port 0;
wherein the second antenna port is an antenna port 1;
wherein the information symbol to be transmitted through the first antenna port to the UE on the predefined subcarrier is defined by space-frequency block code (SFBC); and
wherein the information symbol to be transmitted through the second antenna port to the UE on the predefined subcarrier is defined by the SFBC.

6. The method according to claim 4, wherein:
a difference between a number of network nodes comprised in the first network node group and a number of network nodes comprised in the second network node group is less than a predefined threshold.

7. A network node, configured with N antennas, wherein N is an even number greater than or equal to 4, comprising:
a receiving unit, adapted to receive a configuration command;
a configuring unit, adapted to, according to the configuration command received by the receiving unit, configure antenna ports of M antennas as a first antenna port and to configure antenna ports of N-M antennas as a second antenna port, wherein M is a number equal to N divided by 2;
a processing unit, adapted to multiply an information symbol to be transmitted through the first antenna port by a first beamforming vector to obtain a first weighing matrix and to multiply an information symbol to be transmitted through the second antenna port by a second beamforming vector to obtain a second weighing matrix, wherein both the first beamforming vector and the second beamforming vector are M-dimensional column vectors;
M first transmitting units, each located on an antenna mapping to the first antenna port, wherein each of the first transmitting units adapted to transmit an element in the first weighing matrix obtained by the processing unit to a user equipment (UE) on a predefined subcarrier, wherein each first transmitting unit transmits an element from a fixed row in the first weighing matrix and the elements transmitted by first transmitting units on different antennas are from different rows in the first weighing matrix; and
N-M second transmitting units, each located on an antenna mapping to the second antenna port, wherein each of the second transmitting units is adapted to transmit an element in the second weighing matrix obtained by the processing unit to the UE on the predefined subcarrier, wherein each second transmitting unit transmits an element from a fixed row in the first weighing matrix and the elements transmitted by the second transmitting units on different antennas are from different rows in the second weighing matrix.

8. The network node according to claim 7, wherein:
the configuring unit is adapted to configure the antenna ports of the M antennas as an antenna port 0 and to configure antenna ports of the remaining (N-M) antenna as an antenna port 1.

9. A transmit diversity system, comprising:
a first network node group; and
a second network node group;
wherein network nodes in the first network node group and the second network node group are located in a single cell, and
wherein one antenna is configured on each of the network nodes in the first network node group and the second network node group;
wherein a network node in the first network node group comprises:
a first transceiving unit, adapted to receive a first configuration command; and
a first processing unit, adapted to configure an antenna port of a local antenna as a first antenna port according to the first configuration command received by the first transceiving unit;
wherein the first transceiving unit is further adapted to transmit an information symbol to be transmitted through the first antenna port to a user equipment (UE) on a predefined subcarrier; and
a network node in the second network node group comprises:
a second transceiving unit, adapted to receive a second configuration command; and
a second processing unit, adapted to configure an antenna port of a local antenna as a second antenna port according to the second configuration command received by the second transceiving unit;
wherein the second transceiving unit is further adapted to transmit an information symbol to be transmitted through the second antenna port to the UE on a predefined subcarrier.

10. The system according to claim 9, wherein the first processing unit is adapted to configure the antenna port of the local antenna as an antenna port 0; and
wherein the second processing unit is adapted to configure the antenna port of the local antenna as an antenna port 1.

* * * * *